(12) United States Patent
Denholm et al.

(10) Patent No.: US 6,592,837 B2
(45) Date of Patent: Jul. 15, 2003

(54) NARROW SIZE DISTRIBUTION GROUND CALCIUM CARBONATE COMPOSITIONS

(75) Inventors: Charles B. Denholm, Appleton, WI (US); H. Larry Williams, Cochran, GA (US); Robert E. Hardy, Macon, GA (US)

(73) Assignee: CarboMinerals, Mcaon, GA (US)

( * ) Notice: Subject to any disclaimer, the term of this patent is extended or adjusted under 35 U.S.C. 154(b) by 77 days.

(21) Appl. No.: 09/839,881

(22) Filed: Apr. 20, 2001

(65) Prior Publication Data

US 2002/0155055 A1 Oct. 24, 2002

(51) Int. Cl.⁷ ............................. C01F 11/18; C09C 3/04
(52) U.S. Cl. ..................... 423/430; 106/464; 423/165; 241/15; 241/17
(58) Field of Search ............... 241/15, 16, 17; 423/165, 430; 106/464

(56) References Cited

U.S. PATENT DOCUMENTS

| | | |
|---|---|---|
| 1,872,891 A | 8/1932 | Church et al. |
| 3,347,624 A | 10/1967 | Taylor |
| 3,604,634 A * | 9/1971 | Windle ..................... 241/16 |
| 4,159,312 A | 6/1979 | Shibazaki et al. |
| 4,170,658 A | 10/1979 | Skinner et al. |
| 4,244,933 A | 1/1981 | Shibazaki et al. |
| 4,278,208 A | 7/1981 | Falcon-Steward |
| 4,279,661 A | 7/1981 | Strauch et al. |
| 4,732,748 A | 3/1988 | Stewart et al. |
| 4,767,464 A | 8/1988 | Strauch et al. |
| 4,835,195 A * | 5/1989 | Rayfield et al. ............. 523/220 |
| 5,007,964 A | 4/1991 | Tsukisaka et al. |
| 5,181,662 A * | 1/1993 | Bousquet et al. ............. 241/16 |
| 5,215,734 A | 6/1993 | Kunesh et al. |
| 5,269,818 A | 12/1993 | Kunesh et al. |
| 5,292,365 A * | 3/1994 | Delfosse ..................... 106/464 |
| 5,676,747 A * | 10/1997 | Brown ....................... 106/465 |
| 5,833,747 A | 11/1998 | Bleakley et al. |
| 6,003,795 A | 12/1999 | Bown et al. |
| 6,402,824 B1 * | 6/2002 | Freeman et al. ............. 106/464 |

FOREIGN PATENT DOCUMENTS

JP 05319815 A * 12/1993

* cited by examiner

Primary Examiner—Steven Bos
Assistant Examiner—Anthony Kuhar
(74) Attorney, Agent, or Firm—Foley & Lardner

(57) ABSTRACT

Ground calcium carbonate compositions having narrow particle size distributions and a method for producing the compositions. The method involves forming a substantially dispersant-free calcium carbonate suspension, wet-grinding the suspension, and aging the suspension. The method does not require the use of classification equipment and the aging process does not require heating.

14 Claims, 2 Drawing Sheets

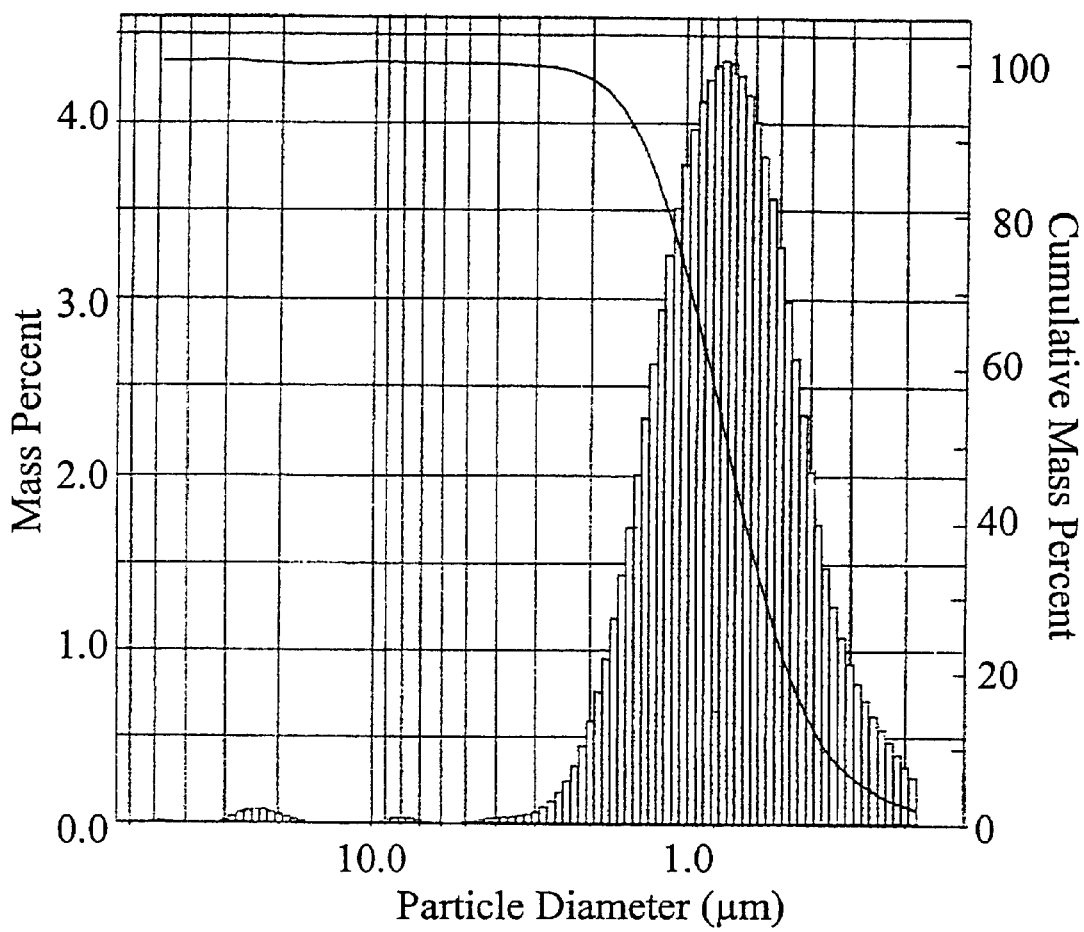
Figure 1. Calcium Carbonate Composition After Wet-Grinding

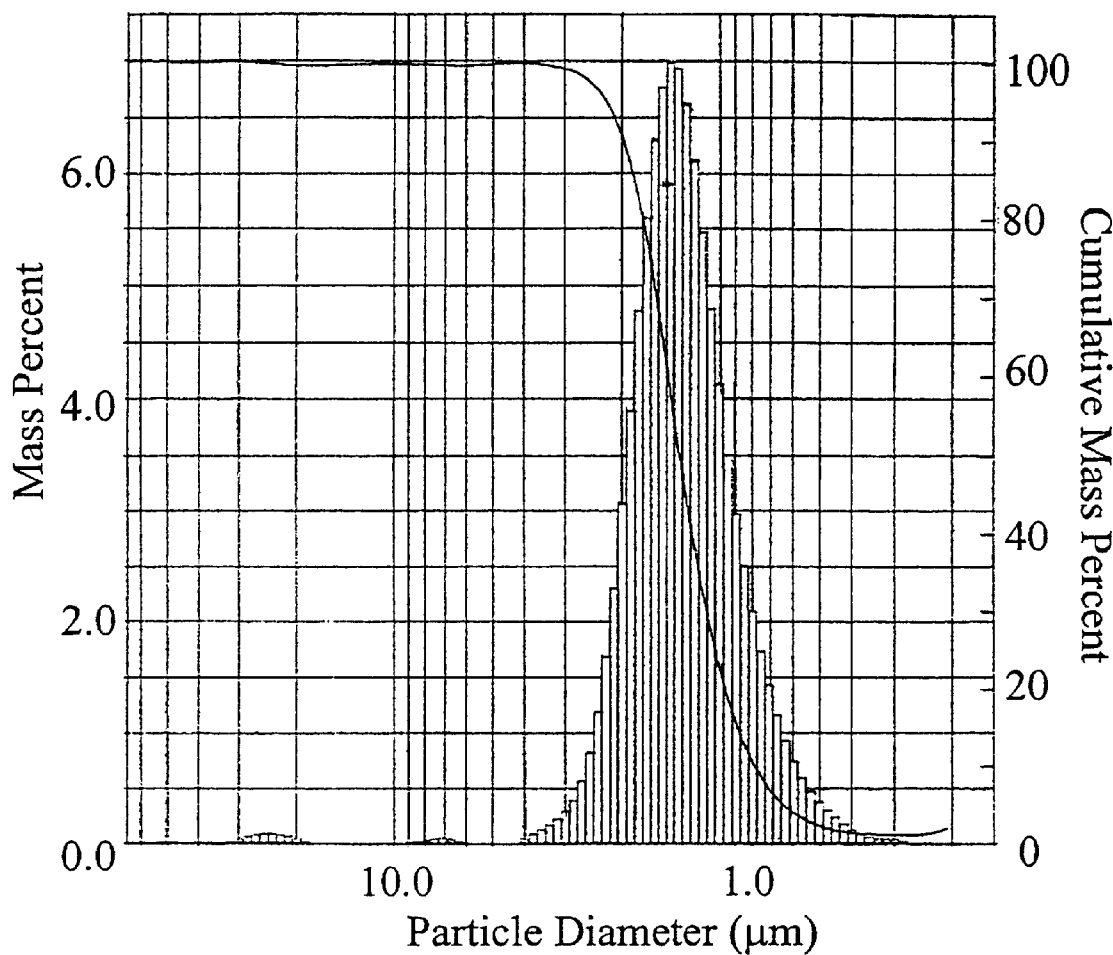
Figure 2. Calcium Carbonate Composition After Aging

200
NARROW SIZE DISTRIBUTION GROUND CALCIUM CARBONATE COMPOSITIONS

FIELD OF THE INVENTION

This invention relates to ground calcium carbonate compositions having narrow size distributions and to an aging method for producing the compositions.

BACKGROUND OF THE INVENTION

Calcium carbonate has been used in the paper-making industry for many years to enhance opacity in wet end filling operations as well as coating applications. Optical properties, such as brightness and opacity, of a final paper product are affected by the particle size and particle size distribution of the calcium carbonate compositions used to make them. Generally, the narrower the size distribution of the calcium carbonate composition the better the optical properties of the final paper product.

The calcium carbonates used in the paper making industry come in two principle forms: 1) ground natural calcium carbonates and 2) precipitated calcium carbonates. Sources for natural calcium carbonate include limestone, dolomite, marble, chalk and shells. Precipitated calcium carbonates are generally obtained by the carbonization of calcium hydroxide.

Samples of precipitated calcium carbonates are finer and generally have narrower particle size distributions, and therefore better optical properties, than samples of ground calcium carbonates. For this reason precipitated calcium carbonates have traditionally dominated the paper filler market. In contrast, the theological properties of ground natural calcium carbonates make them better suited for use in paper coating formulations. Such formulations are commercially available in the form of fully-dispersed high-solids suspensions. Ground calcium carbonates have also been used as fillers in the papermaking industry. Unfortunately, however, paper sheets made with ground natural calcium carbonate, while having higher sheet strength, tend to have lower brightness and opacity than those made with precipitated calcium carbonate fillers.

The ability to make ground calcium carbonate fillers with narrower particle size distributions has been limited in the past by the methods used in their production. Conventional methods for preparing ground calcium carbonate compositions for use in the papermaking industry involve the preparation of aqueous calcium carbonate suspensions. Conventional ground calcium carbonate suspensions have a high solids concentration, generally greater than 60 percent by weight. Because high solids suspensions have high viscosities they must contain dispersants to ensure that particles remain dispersed and to lower the viscosity, enabling the suspensions to flow easily for processing. Unfortunately, the presence of dispersants in conventional calcium carbonate suspensions may result in reduced filler retention in papers made from those suspensions.

Once prepared the suspensions are wet-ground to reduce the average size of the filler particles. Finally, the size distribution of the filler particles is narrowed mechanically using classification equipment to remove the fine particles. For example, size classification can be performed by means of a centrifuge, hydraulic cyclones, or by gravitational sedimentation. A disadvantage of methods of production that employ classification equipment is that they add to both the time and cost of paper production by the addition of extra processing steps and equipment.

A method of narrowing the particle size distribution in a sample of precipitated calcium carbonate or ground natural limestone that does not involve the use of classification equipment is heat-aging. Heat-aging, also known as Ostwald ripening, is a process by which crystals of calcium carbonate initially of a higher internal energy state and having a relatively small average particle size undergo a phase transformation by dissolving and redepositing on crystals having a lower internal energy. The heat-aging process requires that the sample be heated to elevated temperatures, generally near 100° C., and it has been found that heat-aging will not occur to any significant extent at temperatures below about 40° C. or at pH levels less than about 8.5. Unfortunately, conventional heat-aging is a slow, time-consuming, and highly capital intensive process.

Thus a need exists for a simple, efficient, and low-cost method of producing a substantially dispersant-free ground natural calcium carbonate filler composition having a narrow particle size distribution.

SUMMARY OF THE INVENTION

This invention is based on the discovery that the size distribution of calcium carbonate particles in a substantially dispersant-free suspension can be narrowed by allowing the suspension to age in the absence of heating.

The present invention provides finely divided ground natural calcium carbonate filler compositions having very narrow particle size distributions and a method for making the compositions. In particular, this invention provides a method wherein a substantially dispersant-free aqueous suspension of calcium carbonate is wet-ground to produce a calcium carbonate composition having a given particle size distribution. The suspension is then allowed to age at temperatures below 40° C., resulting in a narrowing of the calcium carbonate particle size distribution.

BRIEF DESCRIPTION OF THE DRAWINGS

In the drawings:

FIG. 1 shows a SediGraph of a sample of ground calcium carbonate manufactured according to the present invention. The SediGraph was obtained immediately after wet-grinding.

FIG. 2 shows a SediGraph of a sample of ground calcium carbonate manufactured according to the present invention. The SediGraph was obtained after aging.

DETAILED DESCRIPTION OF THE INVENTION

The present invention relates to calcium carbonate compositions having very narrow particle size distributions and to a method for making them. Specifically, the method provides for forming a substantially dispersant-free aqueous suspension of calcium carbonate particles, wet-grinding the suspension to produce a first calcium carbonate composition having a first particle size distribution, and aging the suspension to produce a second calcium carbonate composition having a second particle size distribution which is narrower than the first particle size distribution.

The size distribution of calcium carbonate particles in a given composition may be represented on a SediGraph which plots cumulative mass percent as a function of particle size. Where cumulative mass percent is the percent, by weight, of a distribution having a particle size of less than or equal to a given value and where particle size is the diameter of an equivalent spherical particle. The mean particle size in a distribution is the size in microns of the calcium carbonate particles at the 50% point on the SediGraph for that distribution. The width of the particle size distribution of a given composition can be characterized using a steepness ratio. As used herein, the steepness ratio is defined as the average diameter of the particles in the seventy-fifth mass percentile divided by the average diameter of the particles in the twenty-fifth mass percentile.

Without wishing to be limited to a particular theory, the inventors believe that the narrowing of the distribution is due to energetically unstable fine particles in the suspension agglomerating to reach a lower energy configuration which stabilizes the suspension. Because dispersants interfere with this process, the suspension should remain substantially dispersant-free. A substantially dispersant-free suspension is one in which the amount of dispersant is too low to hinder the aging process. Preferably the concentration of dispersant is below about 0.05%. More preferably, there is an absence of dispersant in the suspension.

The suspensions of the invention have low solid concentrations to ensure that the particles remain dispersed in the absence of dispersant and to maintain low viscosities, making them easy to process. In addition, the use of a low solids suspensions is advantageous because wet-grinding is more efficient in terms of time and energy input at lower solid concentrations. As a result, the weight percent of calcium carbonate in the suspensions of the present invention is preferably less than about 30 weight percent and more preferably no more than about 25 percent. In a particularly preferred embodiment the weight percent of calcium carbonate in the suspension is between about 25 and about 23 weight percent.

Aqueous suspensions of calcium carbonate are produced by mixing samples of calcium carbonate particles in water with continuous stirring. The ambient pH of this suspension will be approximately 8.2 to 8.7. Once an aqueous suspension is formed, it is wet-ground to reduce the average size of the suspended calcium carbonate particles. Wet-grinding can be accomplished with the use of an attrition mill, including a ball mill or a vertical or horizontal media mill. A variety of grinding media may be used in the mill including, but not limited to, ceramic media, zirconia, and glass. Preferably, the grinding media will have a nominal size of about 0.7 to about 1 millimeter on average. Preferred embodiments of the invention do not include the use of classification equipment. The elimination of this equipment simplifies the procedure and reduces costs.

After wet-grinding, the suspensions are set aside to age. Aging takes place at temperatures below 40° C., preferably below about 35° C., and more preferably below about 30° C. In a preferred embodiment of the invention, aging takes place at ambient temperatures in the absence of heating. Generally this will mean aging the suspension at room temperature, or at temperatures near about 20 to about 25° C. This eliminates the need for temperature controlling equipment, simplifying the process and reducing costs. The time required for aging will depend on the particle size distribution of the initial calcium carbonate sample as well as the desired final particle size distribution. Preferably aging continues until the steepness ratio of the composition is lowered by at least 10%, preferably by at least 20%, and more preferably by at least 30%. In a preferred embodiment, aging will last about 24 hours. In more preferred embodiments, aging will last from between about 1 and about 24 hours. In particularly preferred embodiments aging will last between about 12 and about 24 hours.

The steepness ratio of the final calcium carbonate suspension will preferably be less than about 2.0, more preferably less than about 1.9. In particularly preferred embodiments the steepness ratio will be between 1.8 and 1.4 and in still more preferred embodiments will be between 1.7 and 1.5. The mean particle size in the final calcium carbonate suspension will preferably be between about 1.2 and about 1.5 micron.

In addition, one embodiment of the present invention provides ground natural calcium carbonate compositions wherein no more than 15 percent of the particles have a size of 2 micron or greater and no more than 35 percent, and preferably no more than 30 percent, of the particles have a size of 1 micron or less. Still other embodiments of the invention provide for compositions in which the size of the particles at 20 mass percent on the SediGraph is no less than 0.9 micron.

Below is an example of a method and composition embodied in the present invention. The example is presented to further illustrate the invention and is not intended to limit its scope.

EXAMPLE 1

A calcium carbonate suspension was prepared as follows. Approximately 1000 grams of dry ground calcium carbonate powder obtained from South America was mixed with 3000 grams of water. The mean particle diameter of the powder as received was approximately 3 microns and the steepness ratio was about 6 to 7. The resulting suspension had a solids content of 25% and a pH of 8.4. The suspension was then wet-ground in an attrition mill for 40 minutes. The mill contained glass beads at a 40% by volume bead load. The tip speed of the attrition mill was set at 1900 FPM. FIG. 1 shows a SediGraph of the ground calcium carbonate composition immediately after wet-grinding. The particle size distribution in the sample was measured using a Micrometrics 5100 SediGraph. Included in the graph is a histogram showing the mass percent of particles as a function of particle diameter. The composition shown in FIG. 1 has a mean particle diameter of approximately 0.8 micron and a steepness factor of approximately 2.5. After wet-grinding, the suspension was allowed to age at approximately 20° C. for 24 hours.

FIG. 2 shows the SediGraph of the ground calcium carbonate composition after aging. Also included in the graph is a histogram of particle diameter versus mass percent. The mean particle diameter in the final distribution was found to be 1.32 micron with a sample steepness ratio of 1.58.

What is claimed is:

1. A method for reducing the width of a particle size distribution comprising:
    (a) forming a substantially dispersant-free aqueous suspension of a ground natural calcium carbonate;
    (b) wet-grinding the suspension to produce a first calcium carbonate composition, wherein the calcium carbonate particles in the first calcium carbonate composition are characterized by a first steepness ratio; and
    (c) aging the first calcium carbonate composition at a temperature below 35° C. to produce a second calcium carbonate composition, wherein the calcium carbonate particles in the second calcium carbonate composition are characterized by a second steepness ratio, and further wherein the second steepness ratio is smaller than the first steepness ratio.

2. The method according to claim 1, wherein the second steepness ratio is below about 1.9.

3. The method of claim 1, wherein the suspension is aged at a temperature below about 30° C.

4. The method according to claim 1, wherein the suspension is aged at a temperature between about 20° C. and about 25° C.

5. The method according to claim 1, where the suspension is aged for a time period of between about 1 hour and about 24 hours.

6. The method according to claim 1, where the suspension comprises less than about 30% calcium carbonate by weight.

7. The method according to claim 1, where the suspension comprises between about 23 and about 25% calcium carbonate by weight.

8. The method according to claim 1, wherein no classification equipment is used.

9. A method for reducing the width of a particle size distribution comprising:
   (a) forming a substantially dispersant-free aqueous suspension of a ground natural calcium carbonate;
   (b) wet-grinding the suspension to produce a first calcium carbonate composition, wherein the calcium carbonate particles in the first calcium carbonate composition are characterized by a first steepness ratio; and
   (c) aging the first calcium carbonate composition in the absence of heating to produce a second calcium carbonate composition, wherein the calcium carbonate particles in the second calcium carbonate composition are characterized by a second steepness ratio, and further wherein the second steepness ratio is smaller than the first steepness ratio.

10. The method according to claim 9, wherein the second steepness ratio is below about 1.9.

11. The method according to claim 9, where the suspension is aged for a time period of between about 1 hour and about 24 hours.

12. The method according to claim 9, where the suspension comprises less than about 30% calcium carbonate by weight.

13. The method according to claim 9, where the suspension comprises between about 23 and about 25% calcium carbonate by weight.

14. The method according to claim 9, wherein no classification equipment is used after wet-grinding and before aging.

* * * * *